3,424,795
α,α'-BIS(AMINOARYL)-XYLENES
Richard B. Lund, Whippany, and John Vitrone, Parsippany, N.J., assignors to Allied Chemical Corporation, New York, N.Y., a corporation of New York
No Drawing. Filed July 25, 1963, Ser. No. 297,663
U.S. Cl. 260—570    16 Claims
Int. Cl. C07c 87/28, 87/50

This invention relates to a novel class of aromatic amines and more particularly to aromatic amines wherein two or more aminoaryl radicals are linked together by an aralkyl bridge.

It has been disclosed in our copending U.S. applications Ser. Nos. 297,693 and 297,685 and now U.S. Patents Nos. 3,267,145 and 3,365,347, respectively filed concurrently herewith that aralkyl nuclear substituted aromatic amines may be produced by reacting an aromatic amine with a compound selected from the group consisting of aromatic compounds having olefinic hydrocarbon substituents and aralkyl alcohols in the presence of an acid-activated clay catalyst. These clays are preferably bentonite-type clays containing about 40 to 80% by weight of silica, 3 to 40% by weight of aluminum and small quantities of one or more oxides of such other metals such as magnesium, calcium, sodium and potassium.

In accordance with the present invention it has been discovered that a novel class of compounds wherein two or more aminoaryl radicals are linked together by an aralkyl bridge may be prepared by the above described process when the compound reacted with the aromatic amine contains two or more functional groups.

The novel aralkyl nuclear substituted aromatic amines of the present invention are selected from the group consisting of amines of the formula:

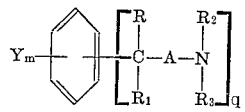

wherein A is selected from the group consisting of

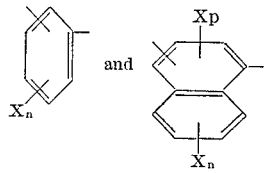

R and $R_1$ are members independently selected from the group consisting of hydrogen, lower alkyl, aralkyl, aryl and cycloalkyl; $R_2$ and $R_3$ are members independently selected from the group consisting of hydrogen and lower alkyl; X and Y are members independently selected from the group consisting of lower alkyl and halogen; $n$ is an integer of 0 to 4, but not more than 2 halogen atoms are substituted on the ring; $q$ is an integer of 2 to 3; $m$ is an integer of 0 to 4 and is such that the sum of $m$ and $q$ does not exceed 6; $p$ is an integer of from 0 to 3 but not more than one halogen atom is substituted on the ring; the

groups are attached to non-adjacent carbon atoms of the central aryl group and the

groups are attached to the ring of the amino aryl radicals at a position other than the position meta to the amino group.

The aromatic amines suitable for use in preparing the compounds of the present invention are those selected from the group consisting of amines of the formula:

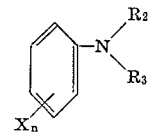

wherein $R_2$, $R_3$, X and $n$ have the meanings given above, and at least one position either ortho or para to the amine group contains a substitutable hydrogen atom; and amines of the formula:

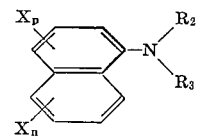

wherein $R_2$, $R_3$, X, $n$ and $p$ have the meanings given above, and at least one position either ortho or para to the amino group contains a substitutable hydrogen atom. Illustrative of suitable aromatic amines which may be employed are aniline; N-methylaniline; N,N-dimethylaniline; N,N-methylethylaniline; 2,6-dimethylaniline; N-methyl-2,6-dichloroaniline; 2-methyl-6-chloroaniline; 4-methylaniline; 2,3,5,6-tetramethylaniline; 2,6-dichloroaniline; and α-naphthylamine.

The aralkyl alcohols suitable for use in preparing the compounds of the present invention are those of the formula:

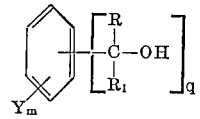

wherein R, $R_1$, Y, $q$ and $m$ have the meanings given above, and the hydroxyalkyl radicals are positioned on non-adjacent carbon atoms of the ring. Illustrative of the aralkyl alcohols which may be employed are α,α'-dihydroxy-1,4-diisopropylbenzene; α,α'-dihydroxy-1,3-diisopropylbenzene; α,α',α''-trihydroxy-1,3,5-triisopropylbenzene; α,α'-dihydroxy-p-xylene, and α,α'-dihydroxy-m-xylene.

The aromatic compounds having olefinic hydrocarbon substituents which are suitable for use in the present invention are compounds of the formula:

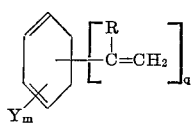

wherein R, Y, $m$ and $q$ have the meanings given above, and the olefinic radicals are positioned on non-adjacent carbon atoms of the ring. Illustrative of the olefinic substituted compounds which may be employed are 1,4-diisopropenylbenzene; 1,3-diisopropenylbenzene; 2,6-dimethyl-1,4-diisopropenylbenzene and 1,3,5-triisopropenylbenzene.

The novel amines of the present invention are exemplified by the following compounds:

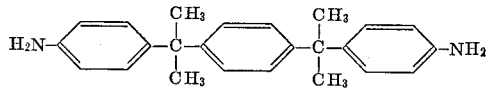

α,α'-bis(4-aminophenyl)-p-diisopropylbenzene

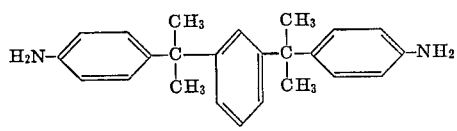

α,α′-bis(4-aminophenyl)-m-diisopropylbenzene

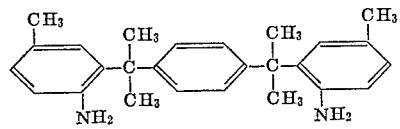

α,α′-bis(2-amino-5-methylphenyl)-p-diisopropylbenzene

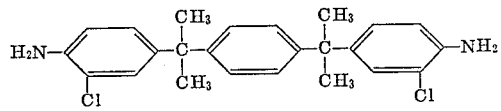

α,α′-bis(4-amino-3-chlorophenyl)-p-diisopropylbenzene

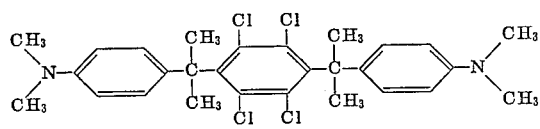

α,α′-bis(4-N,N-dimethylaminophenyl)-2,3,5,6-tetra-chloro-p-diisopropylbenzene

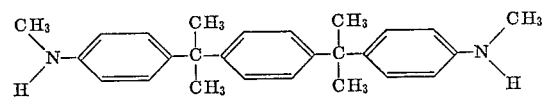

α,α′-bis(4-N-methylaminophenyl)-p-diisopropylbenzene

α,α′-bis(4-aminophenyl)-p-xylene

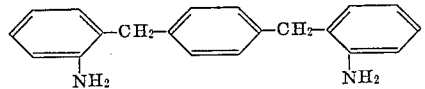

α,α′-bis(2-aminophenyl)-p-xylene

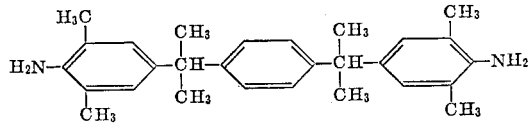

α,α′-bis(3,5-dimethyl-4-aminophenyl)-p-diisopropylbenzene

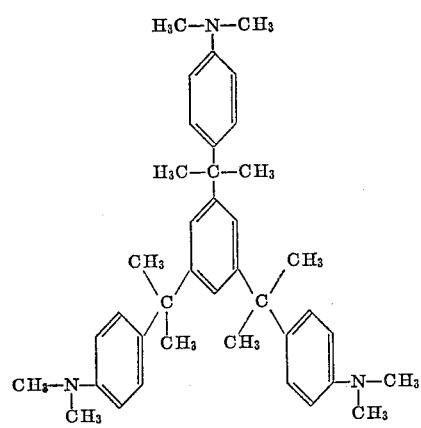

α,α′,α″-tris(4-N,N-dimethylaminophenyl)-1,3,5-triisopropylbenzene

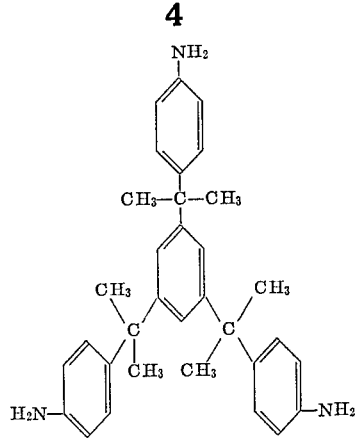

α,α′,α″-tris(4-aminophenyl)-1,3,5-triisopropylbenzene

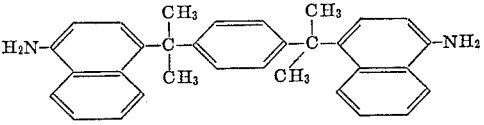

α,α′-bis(4-aminonaphthyl)-p-diisopropylbenzene, and

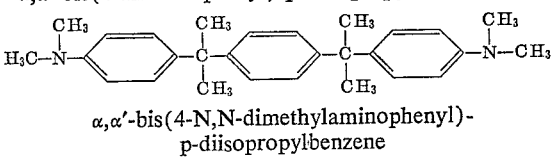

α,α′-bis(4-N,N-dimethylaminophenyl)-p-diisopropylbenzene

A preferred class of monocyclic compounds are exemplified by the formula:

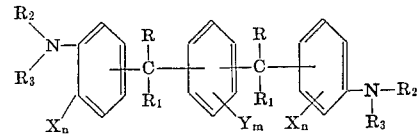

wherein R and $R_1$ are members independently selected from the group consisting of hydrogen, lower alkyl, aralkyl, aryl and cycloalkyl; $R_2$ and $R_3$ are members independently selected from the group consisting of hydrogen and lower alkyl; X and Y are members independently selected from the group consisting of lower alkyl and halogen; $n$ is an integer of from 0 to 4, but not more than two halogen atoms are substituted on the ring; $m$ is an integer of 0 to 4; the

groups are attached to non-adjacent carbon atoms of the central aryl group and the

groups are attached to the ring of the amino aryl radicals at a position other than the position meta to the amino group.

Compounds in which the methyl groups are attached to the carbon atoms linking the cyclic groups are illustrated by the following formula:

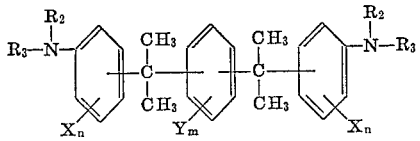

wherein $R_2$ and $R_3$ are members independently selected from the group consisting of hydrogen and lower alkyl, X and Y are members independently selected from the group consisting of lower alkyl and halogen, $n$ is an integer of from 0 to 4, but not more than two halogen atoms are substituted on the ring; $m$ is an integer of from 0 to 4; the

groups are attached to non-adjacent carbon atoms of the central aryl group and the

groups are attached to the ring of the amino aryl radicals at a position other than the position meta to the amino group.

Compounds in which the hydrogens are attached to carbon atoms linking the cyclic groups are illustrated by the following formula:

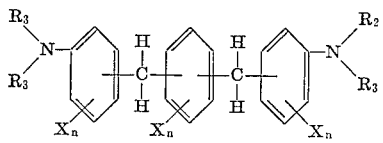

wherein $R_2$ and $R_3$ are members independently selected from the group consisting of hydrogen and lower alkyl, X and Y are members independently selected from the group consisting of lower alkyl and halogen, $n$ is an integer of from 0 to 4, but not more than two halogen atoms are substituted on the ring; $m$ is an integer of from 0 to 4; the

groups are attached to non adjacent carbon atoms of the central aryl group and the

groups are attached to the ring of the amino aryl radicals at a position other than the position meta to the amino group.

The compounds of the present invention are useful as crosslinking agents for chlorinated rubbers and epoxy resins and as intermediates in the preparation of polyamides and polyisocyanates. The polyisocyanates, which may be prepared by treating the herein described polyfunctional amines with phosgene, are particularly useful as intermediates in the production of urethanes and polyurethanes. Copending applications Ser. Nos. 297,693 and 297,685 and now U.S. Patent Nos. 3,267,145 and 3,365,347, respectively set forth examples showing the preparation of urethanes by the reaction of monohydric and dihydric alcohols with polyfunctional aralkyl substituted aromatic amines. Copending application, Ser. No. 297,660 filed concurrently herewith and now abandoned discloses the preparation of high tensile strength, high elastic modulus, elastomeric polyurethanes from such amines.

The halogenated compounds of the present invention may be prepared in two ways. First, they may be made directly in the reaction effecting an aralkyl substitution by the use of at least one halogenated reactant, e.g. the reaction of 2-chloroaniline with an aralkyl alcohol such as $\alpha,\alpha'$-dihydroxy-1,4-diisopropylbenzene, or an olefinic hydrocarbon such as 1,4-diisopropenylbenzene. Second, a polyfunctional aralkyl substituted aromatic amine of the present invention may be post-chlorinated by acetylation of the amine groups followed by chlorination of the acetanilide and subsequent hydrolysis of the chlorinated amide to recover the chlorinated amine.

The following examples are given to further illustrate the invention but it is to be understood that the invention is not to be limited in any way by the details described therein. In the examples a Dean-Stark apparatus was used in drying the clay by azeotropic distillation in order to return the inert solvent to the reaction mixture.

EXAMPLE 1

2325 parts by weight of aniline and 200 parts by weight of acid-activated bentonite clay containing about 64% silica and about 17% alumina were added to 188 parts by weight of toluene. The resulting mixture was then distilled until all the moisture therein had been removed by azeotropic distillation. The mixture was next heated to a temperature of 120° C. whereupon 341 parts by weight of $\alpha,\alpha'$-dihydroxyl-1,4-diisopropylbenzene were added thereto. The resulting reaction mixture was thereupon heated under reflux for a period of 4 hours at the end of which evolution of water from the mixture had ceased. The mixture was then refluxed for an additional 4 hours at the end of which it was immediately filtered to remove the catalyst therefrom. The catalyst was washed thoroughly with toluene and the collected combined filtrates were cooled to 25° C. whereupon crystals of $\alpha,\alpha'$-bis(4-aminophenyl)-p-diisopropylbenzene were obtained. The product possessed a melting point of 162–164°C. and was obtained in a yield of 94% of theoretical.

EXAMPLE 2

A mixture of 321 grams of p-toluidine, 60 grams of acid-activated P.C. Blue clay (bentonite-type clay containing about 63% of $SiO_2$, 23% of $Al_2O_3$, 9% of $Fe_2O_3$, 3% of CaO and 2% of MgO) and 200 cc. of toluene was heated at reflux until the clay was dry. The mixture was then cooled to room temperature and 38.8 grams of $\alpha,\alpha'$-dihydroxy-1,4-diisopropylbenzene were added. The reaction mixture was heated to distill off toluene until a pot temperature of 160° C. was reached. The reaction mixture was then refluxed at 160° C. for 16 hours, after which it was cooled to about 80° C. and the clay removed by filtration. The filtrate was next cooled to 10° C. to crystallize the unreacted p-toluidine which was then removed by filtration. The filtrate was mixed with an excess of 10% aqueous HCl thereby forming an insoluble hydrochloride salt which was separated by filtration. This salt was neutralized with aqueous NaOH and the neutralized product recrystallized from methanol yielding $\alpha,\alpha'$-bis (2-amino-5-methylphenyl)-p-diisopropylbenzene having a melting point of 140–141° C.

EXAMPLE 3

A mixture of 100 ml. of toluene and 100 grams of Filtrol No. 4 (acid-activated bentonite-type clay) was refluxed to remove the water from the clay by azeotropic distillation. The mixture was then cooled to room temperature and 57 grams of $\alpha,\alpha'$-dihydroxy-p-xylene and 780 ml. of aniline were added. The reaction mixture was refluxed for 31 hours after which it was cooled to about 80° C. and the clay removed by filtration. Distillation of the filtrate to remove toluene and excess aniline gave 97% yield of an isomeric mixture of $\alpha,\alpha'$-bis(4-aminophenyl)-p-xylene and $\alpha$-(4-aminophenyl)-$\alpha'$-(2-aminophenyl)-p-xylene. The $\alpha,\alpha'$-bis(4-aminophenyl)-p-xylene was isolated as a white crystalline solid, with a melting point of 125–126° C. by recrystallization from ethyl acetate.

EXAMPLE 4

A mixture of 279 grams of aniline, 45 grams of acid-activated P.C. Blue clay and 100 cc. of toluene was heated at reflux until all of the water was removed. The mixture was then cooled to room temperature and 63 grams of $\alpha,\alpha',\alpha''$-trihydroxy-1,3,5-triisopropylbenzene added (mol ratio aniline to tricarbinol of 12 to 1). The reaction mixture was then refluxed for 10 hours after which it was cooled to room temperature and the clay removed by filtration. Distillation of the filtrate to remove toluene and excess aniline gave 93 grams of a residue which set up to a solid glass. This was found to be α,α',α''-tris(4-aminophenyl)-1,3,5-triisopropylbenzene by infrared and nuclear magnetic resonance studies and by elemental analysis.

EXAMPLE 5

A mixture of 75 grams of acid-activated P.C. Blue clay and 100 ml. of toluene was refluxed until the clay was dried by the removal of 7.0 ml. of water from the mixture. After the clay was dry, 50 ml. of toluene were removed from the mixture by distillation. The mixture was then cooled to room temperature and 97 grams of α,α'-dihydroxy-1,3-diisopropylbenzene and 452 ml. of aniline were added thereto. The reaction mixture was refluxed for about 19 hours after which the clay was separated by filtration. The filtrate was then distilled to remove toluene and unreacted aniline leaving a viscous fluid. This viscous fluid was mixed in aqueous 10% HCl solution thereby forming an insoluble hydrochloride salt which was separated from the liquid phase by filtration. The hydrochloride salt was neutralized with aqueous ammonia and after crystallization from isopropanol there was obtained a 56% yield of α,α'-bis(4-aminophenyl)-m-diisopropylbenzene having a melting point of 108–110° C.

EXAMPLE 6

A mixture of 100 grams of Filtrol No. 4 and 200 ml. benzene was refluxed to remove the water from the clay by azeotropic distillation. The mixture was then cooled to room temperature and 65.5 grams of p-diisopropenylbenzene and 500 ml. of 2,6-dimethylaniline were added. The reaction mixture was refluxed for 16 hours after which it was cooled to about 80° C. and the clay removed by filtration. Removal of the benzene and excess 2,6-dimethylaniline by distillation gave an 85% yield of crude α,α'-bis(3,5 - dimethyl - 4 - aminophenyl) - p - diisopropylbenzene. Recrystallization from isopropanol gave a 70% yield of purified product having a melting point of 148–150° C.

EXAMPLE 7

A mixture of 80 grams of acid-activated P.C. Blue clay and 200 ml. of toluene was refluxed to remove the water from the clay. The mixture was then cooled to 80° C. and 321 grams of N-methylaniline were added. The mixture was then heated to reflux and 40 grams of p-diisopropenylbenzene and 250 ml. of toluene were added dropwise over a two hour period. The reaction mixture was refluxed for an additional 8 hours after which it was cooled to 80° C. and the clay removed by filtration. The filtrate was mixed with 1 liter of 10% aqueous HCl, which was added dropwise thereby forming the insoluble HCl salt of the bis-amine. This insoluble salt was removed by filtration and neutralized with 10% alcoholic KOH. After recrystallization from ethanol there was obtained a 55% yield of α,α'-bis(4-N-methylaminophenyl)-p-diisopropylbenzene having a melting point of 124–125.5° C.

EXAMPLE 8

A mixture of 60 grams of acid-activated P.C. Blue clay catalyst and 150 cc. of toluene was refluxed to dry the clay. The mixture was then cooled to room temperature and 3 moles of N,N-dimethylaniline and 0.2 mole of p-diisopropenylbenzene were added. The reaction mixture was refluxed for 3 hours, after which it was cooled to about 80° C. and the clay removed by filtration. The filtrate was mixed with 1 liter of 10% aqueous HCl, added dropwise, thereby forming an insoluble HCl salt. This salt was removed by filtration and neutralized with 10% alcoholic KOH to give a 73% yield of α,α'-bis(4-N,N-dimethylaminophenyl)-p-diisopropylbenezene. After recrystallization from isopropanol this compound had a melting point of 152–153° C.

EXAMPLE 9

A mixture of 100 grams of acid-activated P.C. Blue clay was refluxed with 100 mls. of toluene until the clay was dry. A solution of 111 grams of p-diisopropenylbenzene in 436 mls. of aniline was then added to the mixture dropwise at 105°–110° C. over a 2 period. The reaction mixture was next maintained at 107° C. for a period of 16 hours following which it was cooled to about 80° C. and the clay removed by filtration. The toluene and unreacted aniline were removed from the filtrate by distillation leaving 220 grams of α,α'-bis(4-aminophenyl)-p-diisopropylbenzene having a melting point of 145–150° C.

EXAMPLE 10

The bis-aniline of Example 1 was transformed into the corresponding diacetyl derivative (melting point 265–267°) by reaction with a solution of acetic anhydride and acetic acid at 80° C. for about 2 hours. The bis-acetanilide thereby obtained was suspended in chloroform at a temperature of 25–35° and treated with gaseous chlorine for ½ hour. The mixture was subsequently cooled and a crude dichloro-bis-acetanilide derivative was obtained on filtration. The product, which was found to be α,α'-bis(4-acetamido-3-chlorophenyl)-p-diisopropylbenzene was recrystallized from ethylene dichloride and obtained in 95% yield of theoretical. Said product possesesd a melting point of 253–255° C.

Said bis-acetanilide was treated with a methanol solution of sodium hydroxide and the resulting product was recrystallized from a methanol-acetone mixture to yield α,α' - bis(4-amino-3-chlorophenyl)-p-diisopropylbenzene in a yield of 80% of theoretical. The product possessed a melting point of 182–184° C. and exhibited the following elemental analysis:

Expected: 69.6% carbon, 6.3% hydrogen, 6.8% nitrogen and 17.2% chlorine. Found: 69.2% carbon, 6.0% hydrogen, 16.8% chlorine, 6.6% nitrogen.

EXAMPLE 11

A mixture of 100 grams of Filtrol No. 4 and 200 ml. of toluene were refluxed to dry the clay. Then 336 grams of α-naphthylamine and a solution of 32 grams of p-diisopropenylbenzene in 150 ml. of benzene were added to the mixture maintained at reflux temperature. The mixture was refluxed for about 18 hours after which it was cooled to room temperature and the clay removed by filtration. After removal of solvents and unreacted α-naphthylamine by distillation, 104 grams of dark colored solid residue were obtained. The residue was recrystallized from cyclohexane and then from trichloroethylene to give α,α'-bis(4-aminonaphthyl) - p - diisopropylbenzene having a melting point of 204–207° C.

It will be apparent that many modifications and variations may be effected without departing from the scope of the novel concepts of the present invention and the illustrative details disclosed are not to be construed as imposing unnecessary limitations on the invention.

We claim:

1. Compounds having the formula:

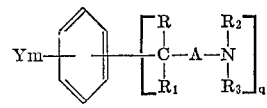

wherein A is selected from the group consisting of

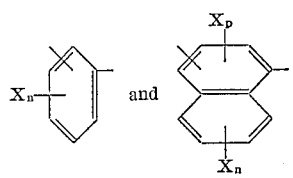

R and $R_1$ are members independently selected from the group consisting of hydrogen and lower alkyl; $R_2$ and $R_3$ are members independently selected from the group consisting of hydrogen and lower alkyl; X and Y are members independently selected from the group consisting of lower alkyl and chlorine; n is an integer of 0 to 2, q is an integer of 2 to 3; m is an integer of 0 to 4 and is such that the sum of m and q does not exceed 6; p is an integer of from 0 to 3 but not more than one halogen atom is substituted on the ring; the

groups are attached to non-adjacent carbon atoms of the central aryl group and the

groups are attached to the ring of the amino aryl radicals at a position other than the position meta to the amino group.

2. Compounds having the formula:

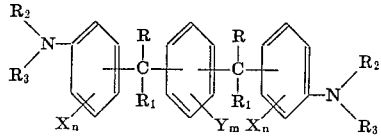

wherein R and R₁ are members independently selected from the group consisting of hydrogen and lower alkyl; R₂ and R₃ are members independently selected from the group consisting of hydrogen and lower alkyl; X and Y are members independently selected from the group consisting of lower alkyl and chlorine; n is an integer of from 0 to 2, m is an integer of 0 to 4; the

groups are attached to non-adjacent carbon atoms of the central aryl group and the

groups are attached to the ring of the amino aryl radicals at a position other than the position meta to the amino group.

3. Compounds having the formula:

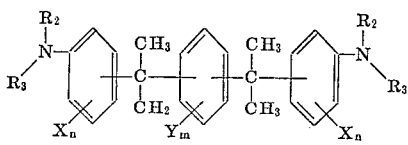

wherein R₂ and R₃ are members independently selected from the group consisting of hydrogen and lower alkyl, X and Y are members independently selected from the group consisting of lower alkyl and chlorine, n is an integer of from 0 to 2, m is an integer of from 0 to 4; the

groups are attached to non-adjacent carbon atoms of the central aryl group and the

groups are attached to the ring of the amino aryl radicals at a position other than the position meta to the amino group.

4. Compounds having the formula:

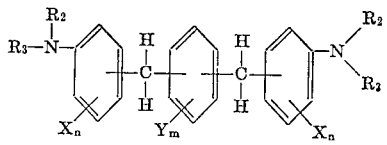

wherein R₂ and R₃ are members independently selected from the group consisting of hydrogen and lower alkyl, X and Y are members independently selected from the group consisting of lower alkyl and chlorine, n is an integer of from 0 to 2, m is an integer of from 0 to 4; the

groups are attached to non-adjacent carbon atoms of the central aryl group and the

groups are attached to the ring of the amino aryl radicals at a position other than the position meta to the amino group.

5. Aromatic amino compounds of the formula:

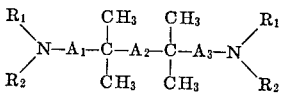

wherein $R_1$ and $R_2$ are substituents selected from the group consisting of hydrogen and saturated alkyl having up to 6 carbon atoms, $A_1$ and $A_3$ are bivalent aromatic nuclei selected from the group consisting of o-phenylene, p-phenylene, and substituted derivatives thereof, wherein the substitutents are selected from the group consisting of monochloro, dichloro, mono saturated alkyl having up to 6 carbon atoms and di-saturated alkyl having up to 6 carbon atoms, and $A_2$ is a bivalent aromatic nucleus selected from the group consisting of m-phenylene and p-phenylene.

6. α,α'-bis(4-aminophenyl)-p-xylene.
7. α,α'-bis(4-aminophenyl)-p-diisopropylbenzene.
8. α,α'-bis(4-aminophenyl)-m-diisopropylbenzene.
9. α,α' - bis(2-amino-5-methylphenyl)-p - diisopropylbenzene.
10. α,α'α'' - tris(4 - aminophenyl)-1,3,5 - triisopropylbenzene.
11. α,α' - bis(4-N-methylaminophenyl)-p - diispropylbenzene.
12. α,α' - bis(4 - N,N-dimethylaminophenyl)-p - diisopropylbenzene.
13. α,α'-bis(3,5-dimethyl)-4 - aminophenyl)-p - diisopropylbenzene.
14. α,α'-bis(4-aminonaphthyl)-p - diisopropylbenzene.
15. α,α'-bis(4-amino-3 - chlorophenyl)-p - diisopropylbenzene.
16. α,α' - bis(4 - N,N - dimethylaminophenyl)-2,3,5,6- tetrachloro-p-diisopropylbenzene.

References Cited

UNITED STATES PATENTS

| | | |
|---|---|---|
| 2,034,491 | 3/1936 | Sloan. |
| 2,683,730 | 7/1954 | Seeger et al. |
| 2,766,263 | 10/1956 | Hahn et al. |

(Other references on following page)

References

UNITED STATES PATENTS

| | | |
|---|---|---|
| 2,548,982 | 4/1951 | Kemp. |
| 3,200,152 | 8/1965 | Ruppert et al. _____ 260—570 |

FOREIGN PATENTS

| | | |
|---|---|---|
| 204,722 | 2/1924 | Great Britain. |
| 557,517 | 1/1932 | Germany. |

CHARLES B. PARKER, *Primary Examiner.*

ROBERT V. HINES, *Assistant Examiner.*

U.S. Cl. X.R.

260—453, 2, 77.5, 47, 78, 915, 618, 669, 562; 252—450, 457

UNITED STATES PATENT OFFICE
CERTIFICATE OF CORRECTION

Patent No. 3,424,795                          January 28, 1969

Richard B. Lund et al.

It is certified that error appears in the above identified patent and that said Letters Patent are hereby corrected as shown below:

Column 5, lines 20 to 25, the formula should appear as shown below:

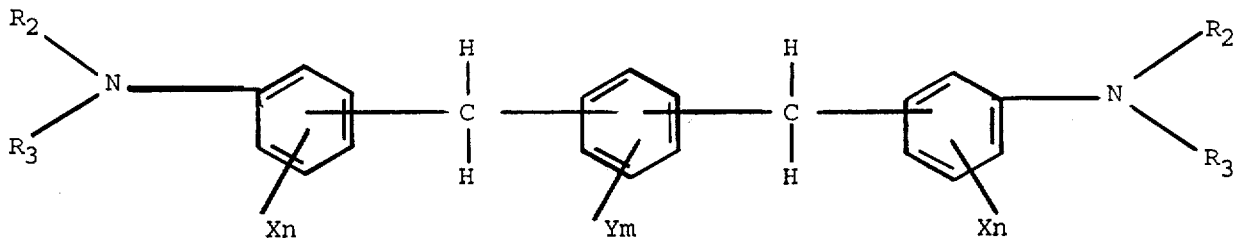

Column 7, line 69, "benezene" should read -- benzene --. Column 8, line 3, "2 period" should read -- 2 hour period --. Column 9, lines 50 to 55, the formula should appear as shown below:

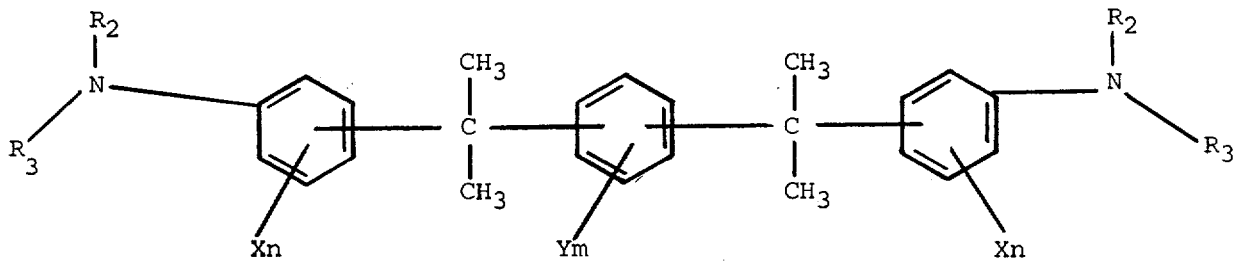

Signed and sealed this 7th day of April 1970.

(SEAL)
Attest:

EDWARD M. FLETCHER, JR.                      WILLIAM E. SCHUYLER, JR.
Attesting Officer                               Commissioner of Patents